United States Patent
Wu et al.

(10) Patent No.: US 11,475,021 B2
(45) Date of Patent: Oct. 18, 2022

(54) FLEXIBLE ALGORITHM FOR TIME DIMENSION RANKING

(71) Applicant: BUSINESS OBJECTS SOFTWARE LTD., Dublin (IE)

(72) Inventors: Ying Wu, Maynooth (IE); Paul O'Connor, Lucan (IE); Esther Rodrigo Ortiz, Castleforbes (IE); Artur Stulka, Lucan (IE); Mateusz Lewandowski, Portlaoise (IE); Paul Sheedy, Dublin (IE); Mairtin Keane, Dublin (IE); Paul O'Hara, Dublin (IE); Malte Christian Kaufmann, Clonskeagh (IE); Robert McGrath, Ranelagh (IE)

(73) Assignee: Business Objects Software Ltd., Dublin (IE)

( * ) Notice: Subject to any disclaimer, the term of this patent is extended or adjusted under 35 U.S.C. 154(b) by 39 days.

(21) Appl. No.: 16/876,441

(22) Filed: May 18, 2020

(65) Prior Publication Data

US 2021/0357417 A1 Nov. 18, 2021

(51) Int. Cl.
*G06F 16/2457* (2019.01)
*G06F 16/2458* (2019.01)

(52) U.S. Cl.
CPC .... *G06F 16/24578* (2019.01); *G06F 16/2477* (2019.01)

(58) Field of Classification Search
CPC .......... G06F 16/24578; G06F 16/2477
See application file for complete search history.

(56) References Cited

U.S. PATENT DOCUMENTS

2005/0114661 A1 5/2005 Cheng et al.
2006/0053136 A1* 3/2006 Ashiri ................ G06F 16/2465
(Continued)

OTHER PUBLICATIONS

Wikipedia.org [online]. ""Augmented Dickey-Fuller Test"" available on or before July 6, 2009, via Internet Archive: Wayback Machine URL <https://web.archive.org/web/20090706075959/http://en.wikipedia.org/wiki/Augmented_Dickey%E2%80%93Fuller_test>, retrieved on Jun. 4, 2020 URL <http://en.wikipedia.org/wiki/Augmented_Dickey%E2%80%93Fuller_test >, 3 pages.

(Continued)

*Primary Examiner* — Jay A Morrison
(74) *Attorney, Agent, or Firm* — Fish & Richardson P.C.

(57) ABSTRACT

The present disclosure involves systems, software, and computer implemented methods for ranking time dimensions. One example method includes receiving a request for an insight analysis for a dataset that includes a value dimension and a set of multiple date dimensions. Each date dimension is converted into a time series and a value quality factor is determined for each time series that represents a level of data quality for the time series. A time series informative factor is determined for each time series that represents how informative the time series is within a specified time window. An insight score is determined, for each time dimension, based on the determined value quality factors and the determined time series informative factors. The insight score for the time dimension is provided, for at least some of the time dimensions.

14 Claims, 19 Drawing Sheets

(56) References Cited

U.S. PATENT DOCUMENTS

| | | | |
|---|---|---|---|
| 2012/0330493 A1* | 12/2012 | Hanatsuka | B60T 8/172 |
| | | | 701/29.1 |
| 2014/0317617 A1 | 10/2014 | O'Donnell et al. | |
| 2017/0364818 A1 | 12/2017 | Wu et al. | |
| 2017/0372224 A1* | 12/2017 | Reimann | G06N 20/00 |
| 2018/0150547 A1 | 5/2018 | Pallath et al. | |
| 2018/0165599 A1 | 6/2018 | Pete et al. | |
| 2018/0285769 A1 | 10/2018 | Wu et al. | |
| 2019/0179835 A1 | 6/2019 | Pallath et al. | |
| 2020/0017117 A1* | 1/2020 | Milton | B60W 50/045 |
| 2020/0098055 A1 | 3/2020 | O'Hara et al. | |
| 2020/0099614 A1* | 3/2020 | Vutharkar | G06F 16/245 |
| 2021/0059616 A1* | 3/2021 | Abrol | A61B 5/746 |

OTHER PUBLICATIONS

U.S. Appl. No. 16/867,036, filed May 5, 2020, Murphy et al.
U.S. Appl. No. 16/876,463, filed May 18, 2020, O'Hara et al.
U.S. Appl. No. 16/877,909, filed May 19, 2020, O'Hara et al.
U.S. Appl. No. 16/890,430, filed Jun. 2, 2020, Banerjee et al.

* cited by examiner

| Example Time Interval Column 402 |
|---|
| [1, 2, 5, 2, 2, 1] 404 |

| Unique Values 408 | Counting Times 410 | Probability 424 | Processed Probability 432 |
|---|---|---|---|
| 1 412 | 2 418 | 2/6=0.33 426 | -0.33*log2(0.33)=0.53 434 |
| 2 414 | 3 420 | 3/6=0.5 428 | -0.5*log2(0.5)=0.5 436 |
| 5 416 | 1 422 | 1/6=0.17 430 | -0.17*log2(0.17)=0.43 438 |
| | | | Sum: 0.53+0.5+0.43=1.46 440 |
| | | | Time Interval Impact Factor: $exp^{-0.25 \cdot 1.46} = 0.69$ 442 |

| Date dimension | Recency | Distribution | Format | Time Series Analysis | Score | Ranking |
|---|---|---|---|---|---|---|
| Date_1 702 (01/01/1014 - 15/07/2019) | 3 718 | Unique values = 600 Missing Values = 0 (from interval impact factor) 4 722 | Days 2 | From informative factor 1 726 | 10 | 1st 736 |
| Date_2 704 (01/01/1014 - 15/07/2019) | 3 | Unique values = 500 Missing values = 100 (from interval impact factor) 2 | Days 2 | From informative factor 2 728 | 9 732 | 2nd |
| Date_3 706 (01/01/1014 - 01/05/2019) | 1 720 | Unique values = 300 Missing values = 300 (from interval impact factor) 1 724 | Days 2 | From informative factor 1 | 5 | 3rd |
| Date_4 708 (01/01/1014 - 07/2019) | 2 | Unique values = 55 Missing values = 0 (from interval impact factor) 3 | Months 1 | From informative factor 3 | 9 | 2nd |

FIG. 7

FLEXIBLE ALGORITHM FOR TIME DIMENSION RANKING

TECHNICAL FIELD

The present disclosure relates to computer-implemented methods, software, and systems for ranking time dimensions.

BACKGROUND

An analytics platform can help an organization with decisions. Users of an analytics application can view data visualizations, see data insights, or perform other actions. Through use of data visualizations, data insights, and other features or outputs provided by the analytics platform, organizational leaders can make more informed decisions.

SUMMARY

The present disclosure involves systems, software, and computer implemented methods for ranking time dimensions. An example method includes: receiving a request for an insight analysis for a dataset, wherein the dataset includes a value dimension and a set of multiple date dimensions, wherein at least some of the date dimensions have missing values over a time range of dates included in the multiple date dimensions, and wherein the request includes a specified time window within the time range; converting each date dimension into a time series; determining, for each time series, a value quality factor that represents a level of data quality for the time series; determining, for each time series, a time series informative factor that represents how informative the time series is within the specified time window; determining, based on the determined value quality factors and the determined time series informative factors, an insight score, for each time dimension, that combines the value quality factor and the time series informative factor for the time dimension; and providing, for at least some of the time dimensions, the insight score for the time dimension.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 illustrates example data used for an example value quality factor calculation.

FIG. 7 is an example ranking table illustrating use of algorithm outputs for other types of ranking

DETAILED DESCRIPTION

Figure 1:
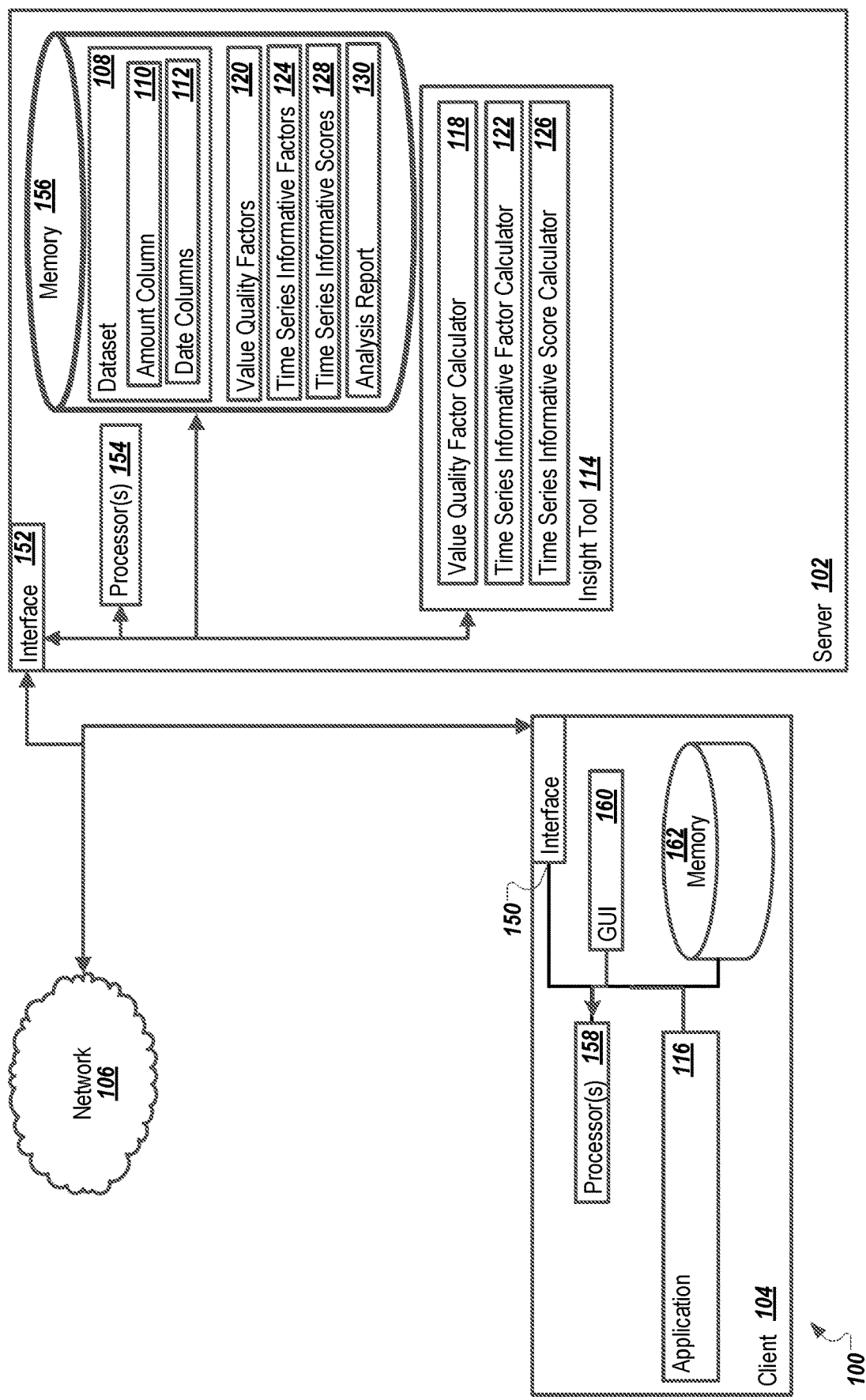
FIG. 1 is a block diagram illustrating an example system for ranking time dimensions.

Data used by organizations continues to increase. Information that is shared between various processes and applications can be defined as a set of objects in a data model. A data model for an organization can specify data structures that are used in organizational processes or applications. Some processes can use transactions that include multiple activities. For instance, a transaction of a particular amount can have separate quotation, ordering, delivery, or return activities, each associated with the same transaction amount.

To represent transactions that include multiple activities, a table can be used that includes a value column and multiple date-type columns. The value column can include numeric values which represent amounts that occur in transactions. The date-type columns can have a date data type and can include date/time values that correspond to times of sequences of activities that occur in transactions. Date-type columns can be referred to as time dimensions within the data model. With the table, rows can represent transactional information for respective transactions. Columns, specifically the amount and date-type columns, can represent activities in terms of occurring time and corresponding amounts, for all transactions.

Organizational users may be interested in knowing which of multiple business activities occurring in a set of transactions may include insightful information (and thereby receive more attention from users/analysts). Providing insight for particular activities can be important and useful for users because when transactions include multiple business activities, some of the activities may perform stably and smoothly throughout all transactions, but other activities may show anomalous or unexpected changes and trends in terms of transaction amounts (e.g., exhibit unstable mean, variance and covariance values over time). Activities with more informative changes may be of more interest to users and providing insight regarding informative activities can notify users to perform further investigation and analysis.

To identify interesting activities occurring in transactions, date-type columns can be ranked so that date-type columns corresponding to interesting underlying activities are detected. To rank date-type columns, each date-type column can be processed as a time series. Each date-type column can be associated with the values in the value column to generate separate time series, each represented by the value column and a date-type column. Each time series can then be ranked, to identify as more informative those time series that have less stationary information. Accordingly, insightful time dimension candidates can be automatically identified based associated values over time. Users can be provided insight results without needing to have detailed understanding of transactional data or time series analysis.

The insight tool can be configured with various flexible features. For example, the insight tool can be configured to perform aggregation when multiple values occur with a same date in a date-type column. Date-type columns can be at different time granularities, such as day, week, month, quarter, or year. Date-type column data can be converted to a standard granularity (e.g., days), in some examples. As described in more detail below, multiple criteria can be considered for ranking time series.

In further detail, the improved approach can include calculation of two different factors for analysis. For instance, a value quality factor and a time series informative factor can be calculated. The value quality factor can provide an indication of data quality for a time series, and can be based on a time interval impact factor. The time series informative factor can represent how informative a time series is, or how interesting/useful the time series is with regards to insightful information. A time series informative score can be based on the value quality factor and the time series informative factor.

Other approaches for comparing time series can have limitations. For example, other approaches can exclude means to weight different time points more heavily than other time points. Rather than assuming that all time points have equal importance over time, the improved insight tool can assign more importance to some time points, for example to model that changes occurring in recent time are more informative than changes that occurred farther in the past. In general, different time intervals of a time series can have different importance, resulting in changes occurring in some time intervals being weighted as more important changes in other time intervals.

Additionally, the insight tool can be flexibly configured so that a time window can be specified, where only part of one time series is observed. Accordingly, changes occurring in the time window can be observed and ranked, conditioned against the changes in the whole time series. For example, an observing time window can be specified, where stationarity is measured only based on the time points located within the specified time window.

As another example, other approaches may require a certain level of data quality for analysis, such as requiring that time series not have any empty values. The improved approach can handle columns having missing dates. For instance, although some columns may be required data (e.g., always present) for a given record, other columns may be optional (and may permit empty or missing values). For instance, a return date may be considered optional data (e.g., a given item may or may not be returned). However, customers may still want to analyze a return date column (among other columns), in case the return date column proves interesting. The improved approach can handle differing data quality for different columns. For example, when there are missing dates in date-type columns, corresponding values in the value column can be excluded from the time series.

FIG. 1 is a block diagram illustrating an example system 100 for ranking time dimensions. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A dataset 108 can represent transactions, such as business transactions. A transaction can have an amount, which can be quantity, cost, or some other type of numeric value. Transaction amounts can be stored in an amount column 110. A transaction can go through different stages, and time points for activities for the different stages can be stored in the dataset 108, as different date columns 112, for example.

For instance, the amount column 110 can hold sales amounts of orders, and the date columns 112 can hold quotation date, order date, delivery date, return date for quotation, ordering, delivery, or return activities, respectively, for any activities that are relevant for the transaction. Each row in the data set can represent a different transaction.

An insight tool 114 can analyze the dataset 108 and determine which date columns 112 include (e.g., after analysis) most (or more) insight as compared to other date columns 112. For instance, the insight tool 114 can identify one or more date columns 112 that best explain values in the amount column 110 in terms of underlying information. The insight tool 114 can analyze the dataset 108 in response to user or system request. For instance, a user of the client device 104 can use an application 116 to send a request for an insight analysis to the server 102.

To compare different date columns 112, each date column 112 can be converted into a time series. For example, different time series can be created for a quotation column, an ordering column, a return column, etc. Each date column 112 can be represented as its own time series. The different time series can be compared, to determine which time series may be more interesting to a user, or include more insight.

In further detail, the insight tool 114 can include a value quality factor calculator 118 that generates value quality factors 120 and a time series informative factor calculator 122 that generates time series informative factors 124. Value quality factors 120 can reflect missing values and distribution of time points in analyzed time series and can indicate data quality of time series for ranking. Time series informative factors 124 can indicate how informative time series are within a specified time window.

A times series informative score calculator 126 can generate time series informative scores 128 based on the value quality factors 120 and the time series informative factors 124. For instance, the insight tool 114 can calculate time series informative scores 128 for each date column 112. A higher time series informative score 128 can indicate a higher level of insight (e.g., more interest) for a date column 112. Accordingly, date columns 112 can be ranked by their time series informative scores 128. Date columns 112 that have both a relatively high value quality factor 120 and a relatively high time series informative factor 124 will generally have higher time series informative scores 128 than date columns 112 that have either a lower value quality factor 120 or a lower time series informative factor 124 (or low values for both scores).

An analysis report 130 that includes ranked time series informative scores 128 for analyzed date columns 112 can be sent to the client device 104, such as for presentation in the application 116. In some cases, only a set of highest, or relatively higher, ranked score(s) are provided. In general, time series informative scores 128 can be provided to users and/or can be provided to other systems (e.g., to be used in other data analysis or machine learning processes).

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application 116. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
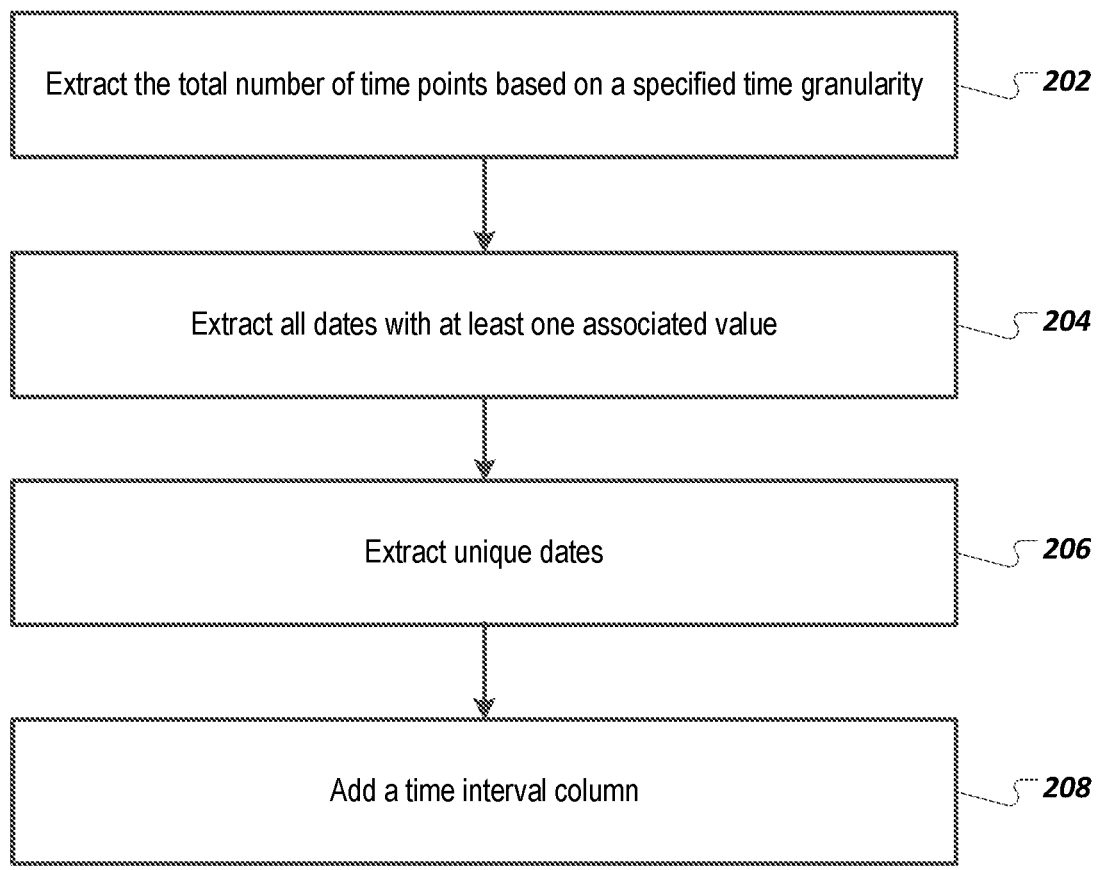
FIG. 2 is a flowchart of an example method for preprocessing a date-type column.

FIG. 2 is a flowchart of an example method 200 for preprocessing a date-type column. Date-type columns can be pre-processed before a value quality factor is determined. It will be understood that method 200 and related methods may be performed, for example, by any suitable system, environment, software, and hardware, or a combination of systems, environments, software, and hardware, as appropriate. For example, one or more of a client, a server, or other computing device can be used to execute method 200 and related methods and obtain any data from the memory of a client, the server, or the other computing device. In some implementations, the method 200 and related methods are executed by one or more components of the system 100 described above with respect to FIG. 1. For example, the method 200 and related methods can be executed by the value quality factor calculator 118 of FIG. 1.

At 202, a total number of time points are extracted from the date-type column based on a specified time granularity. A time granularity can be days, weeks, or months, to name a few examples.

At 204, all dates with at least one associated value are extracted from the date-type column.

At 206, unique dates are extracted from the date-type column (e.g., duplicate dates can be removed/ignored).

At 208, a new time interval column is added to the table and is linked to the date-type column. Values in the time interval column indicate a time interval between a given time point and a previous time point. For example, when the time granularity is specified as days, the time interval between a given time point (Jan. 20, 2020) and the previous time point (Jan. 15, 2020) is 6 days. A time interval value for a first time point can be null (empty). Preprocessed data can be further utilized by the value quality factor calculator, as described below.

Figure 3:
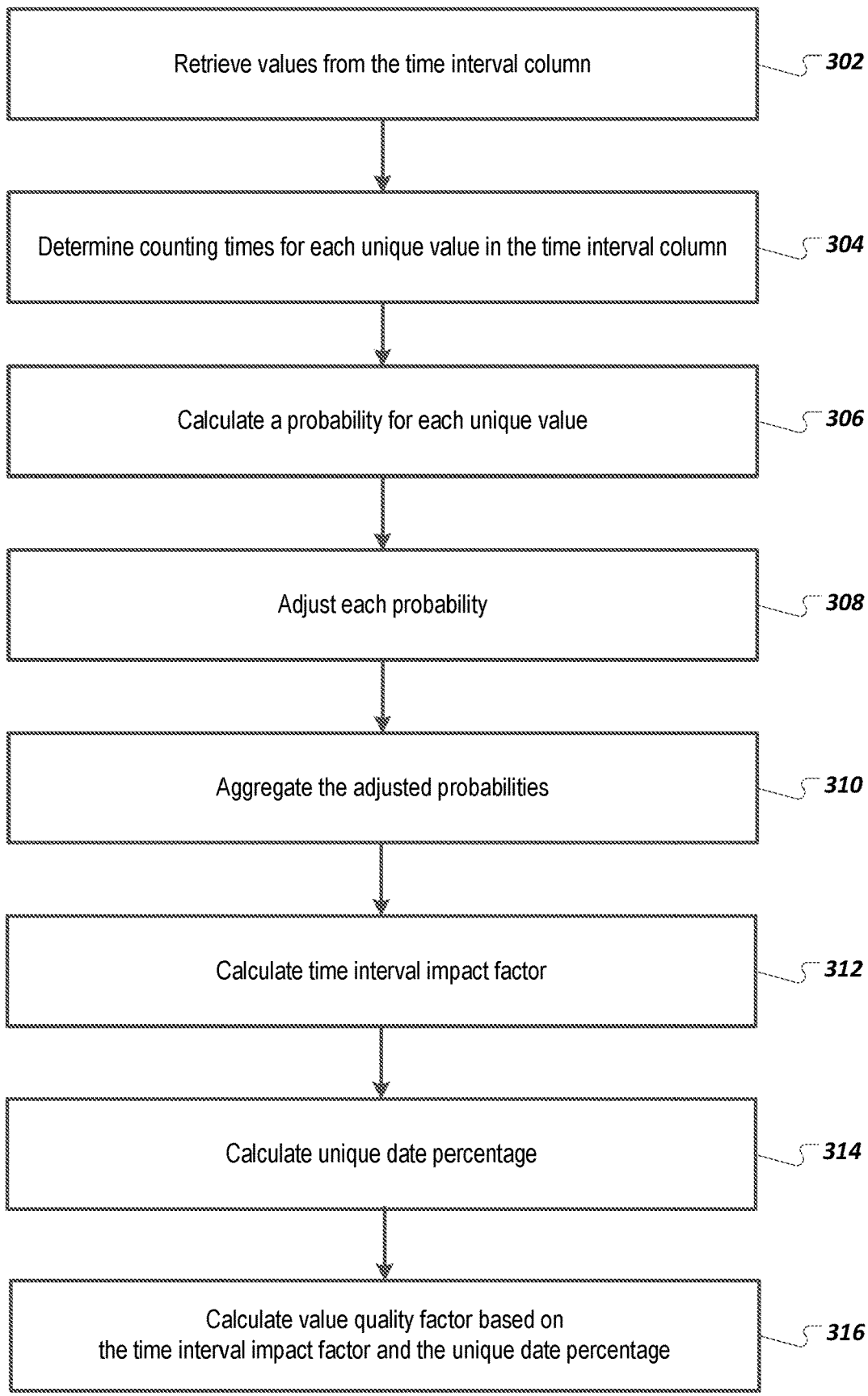
FIG. 3 is a flowchart of an example method for determining a value quality factor for a time series.

FIG. 3 is a flowchart of an example method for determining a value quality factor for a time series. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the value quality factor calculator 118 of FIG. 1.

A value quality factor can be an important criterion which can represent the data quality of one date-type column (e.g., one time series). The value quality factor can be calculated based unique dates, missing dates, and distribution of unique dates.

At 302, values are retrieved from the time interval column. The time interval column can be added during the pre-processing described above with respect to FIG. 2.

At 304, counting times are determined for each unique value in the time interval column. Example data is discussed below.

FIG. 4 illustrates example data 400 used for an example value quality factor calculation. Example time interval columnar data 402 includes values 404 of [1, 2, 5, 2, 2, 1]. A table 406 illustrates unique values 408 and counting time 410 for the time interval columnar data 402. For instance, unique values of one 412, two 414, and five 416 exist in the time interval columnar data 402, with respective counts of two 418, three 420, and one 422.

Referring again to FIG. 3, at 306, a probability is calculated for each unique value. The probability can be calculated by dividing the counting times for the unique value by the number of time interval values (e.g., the number of items in the time series minus one. For instance, the table 406 includes a probability column 424 that includes probability values of 0.33 (426), 0.5 (428), and 0.17 (430), for the unique values 412, 414, and 416, respectively.

At 308, each probability is adjusted. For instance, each probability can be processed using a formula of: $p'=-1 \times p \times \log_2(p)$. For example, the table 406 includes an adjusted (e.g., processed) probability column 432 that includes adjusted probability values of 0.53 (434), 0.5 (436), and 0.43 (438), for the unique values 412, 414, and 416, respectively.

At 310, the adjusted probabilities are aggregated. For example, a sum $\Sigma p'$ can be calculated for the adjusted probabilities. For instance, a sum (440) of 1.46 can be computed by adding together the adjusted probability values of 0.53 (434), 0.5 (436), and 0.43 (438).

At 312, a time interval impact factor is calculated. The time interval impact factor can be based on the aggregated adjusted probability values. For example, a formula of $\exp^{-0.25 \times \Sigma p'}$ can be used to calculate the time interval impact factor. A time interval impact factor 442 has been calculated using the sum 440, for example.

At 314, a unique date percentage is calculated. The unique date percentage can indicate a number of unique dates in an observed time window, and can be calculated by:

$$\text{Unique date \%} = \frac{\text{Number of unique dates}}{\text{Number of time points in observed time window}}.$$

At 316, a value quality factor is determined based on the time interval impact factor and the unique date percentage. For instance, the value quality factor can be calculated as: Value Quality Factor=Unique date %*Time Interval impact Factor.

Figure 5:
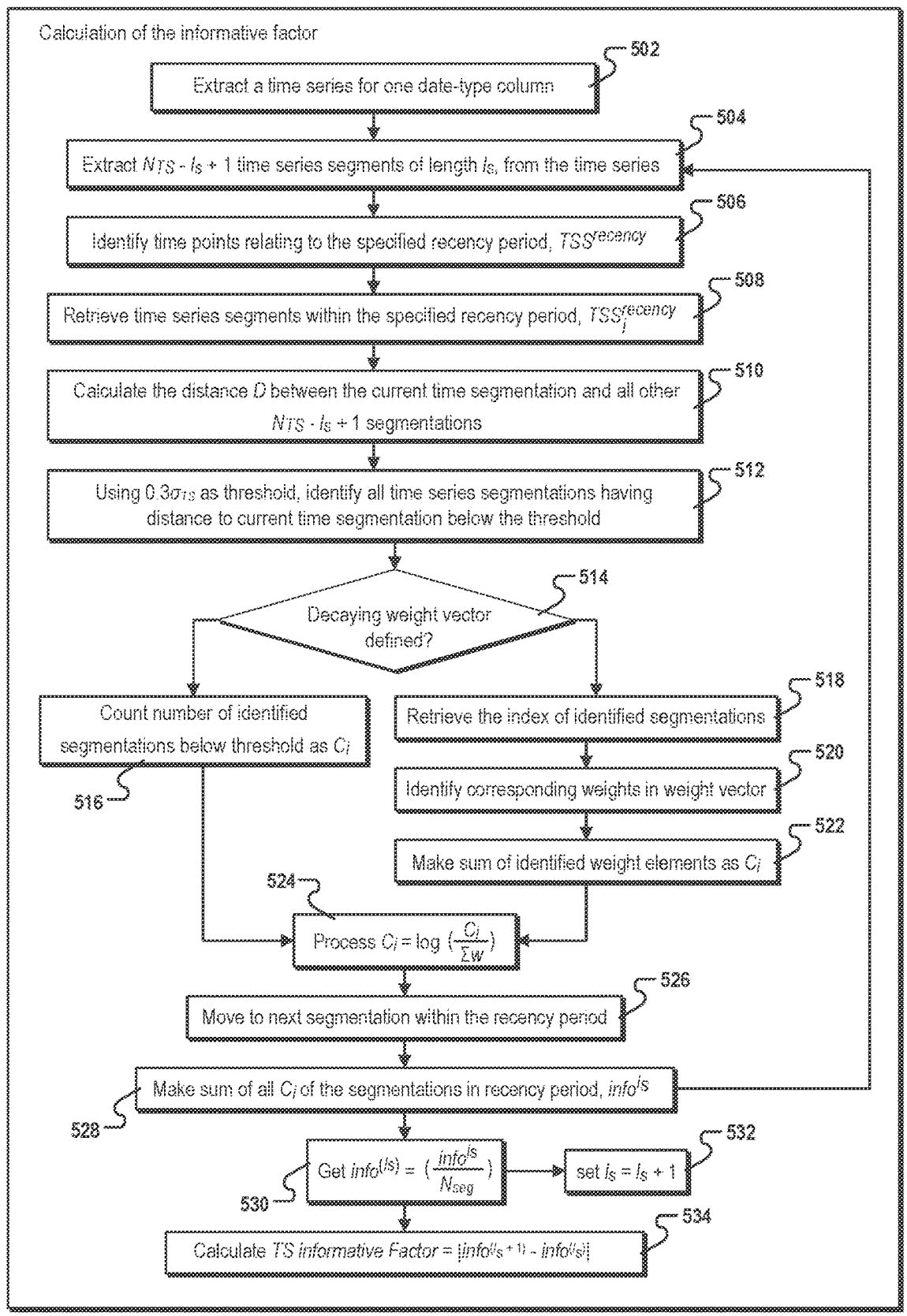
FIG. 5 is a flowchart of an example method for determining a time series informative factor.

FIG. 5 is a flowchart of an example method for determining a time series informative factor. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the time series informative factor calculator 122 of FIG. 1.

At 502, a time series for a selected date-type column is extracted. The method 500 can be performed for each date-type column and each date-type column can be selected in turn. All time points for the selected time series, with both dates and corresponding values, can be retrieved. If the retrieved data is not already sorted by date, the time series data can be sorted according to dates from an earliest date to a most recent date.

Other pre-processing can be performed. For example, the standard deviation of all time series values, $\sigma_{TS}$, can be calculated. As another example, a number of time points of the time series, $N_{TS}$, can be determined. As yet another example, a length of time series segmentation $l_s$ can be determined. Time series segmentation can involve extracting a subset of time points of the time series in groups of a certain size (e.g., the length of time series segmentation). For example, groups of three (e.g., $l_s$=3) can be used. Use of time series segmentations in calculations is described below.

At 504, a count of time series segments equal to $N_{TS}-l_s+1$ each of length $l_s$ are extracted from the time series. For example, starting from a time point $t_0$, a count of $l_s$ time points can be selected to form a time series segment $TSS_0=\{t_0, t_1, \ldots, t_{l_s-1}\}$. Moving to the next time point, $t_1$, a count of $l_s$ time points can be selected to form a time series segment $TSS_1=\{t_1, t_2, \ldots, t_{l_s}\}$. Similarly, processing can continue, e.g. with an offset of one, moving to a next time point $t_i$, selecting a count of $l_s$ time points to form a time series segment $TSS_i=\{t_i, t_{i+1}, \ldots, t_{i+l_s-1}\}$, and continuing such processing until reaching a time point $t_{N_{TS}-l_s+1}$.

At 506, time points of the time series that relate to a specified recency period $TSS^{recency}$ are identified. For instance a count of $N_{Recency}$ time points within the specified recency period, denoted as $\{t_{N_{TS}-N_{Recency}+1}, \ldots, t_{N_{TS}}\}$, can be identified. A recency period can be used to place (or remove) emphasis on most or more recent activity. A recency period can be a most recent time window, such as the past month, the past twenty days, etc. For some data sets, the count of $N_{Recency}$ can be less than the number of days in the time window, due to data quality. For instance, for a date-type column representing order returns, some days might not have values, if no returns happened on those days.

At 508, time series segments within the specified recency period are retrieved. A number of segments that can be retrieved can be based on the count $N_{Recency}$ of time points in the recency period. For example, if $N_{Recency}>l_s$, a count of $N_{Recency}-l_s+1$ time series segments can be identified. If the number of time points in the recency period is less than or equal to the time series segmentation length (e.g., $N_{Recency} \leq l_s$), $N_{Recency}$ can be set to $l_s$ and a last time series segment can be retrieved.

The retrieved time series segments within the specified recency period can be denoted as $TSS^{recency}$. A count of retrieved time series segmentations can be denoted as $N_{Seg}$. If $N_{Recency}>l_s$, a value of $N_{Seg}$ can be $N_{Recency}-l_s+1$. $N_{Recency} \leq l_s$, a value of $N_{Seg}$ can be one. A first iteration construct can be initialized for processing of the retrieved time series segmentations, for example using an index i. A first time series segmentation of the retrieved time series segmentations can be identified for processing as a current time segmentation.

At 510, a distance D between the current time segmentation and all other $N_{TS}-l_s+1$ segmentations is calculated. For example, a second iteration construct, for iterating over all segmentations for comparing to the current segmentation, can be initialized, for example using an index j. For the current time series segmentation, a count $C_i$ of identified segmentations having a distance below the threshold can be initialized to zero. A current compare-to time segmentation, e.g., $TSS_j=\{t_j, t_{j+1}, \ldots, t_{j+l_s-1}\}$, to compare to the current time segmentation, can be retrieved. Intermediate difference values can be calculated as $diff_1=|t_{N_{TS}-N_{Recency}+1+i}-t_j|$, $diff_2=|t_{N_{TS}-N_{Recency}+2+i}-t_{j+1}|, \ldots, diff_{l_s}=|t_{N_{TS}-N_{Recency}+l_s+i}-t_{j+l_s-1}|$. The difference value D between the current time segmentation and the current compare-to time segmentation can be calculated as a maximal value of the values from $diff_1$ to $diff_{l_s}$.

At 512, all time series segmentations having a distance D to the current time segmentation below a threshold are identified. For example, for a given compare-to time segmentation, if D for the compare-to time segmentation is less than $0.3\sigma_{TS}$, then the compare-to time segmentation can be identified as a time segmentation having a distance D to the current time segmentation less than the threshold. In some implementations, the comparison of D to the threshold is done for the current compare-to time segmentation within the second iteration construct. In some implementations, the count $C_i$ for the current time series segmentation is incremented, in response to identifying a compare-to segmentation that has a distance below the threshold.

At 514, a determination is made as to whether a decaying weight vector has been defined. That is, the method 500 can be flexibly configured to handle the existence (or non-existence) of a weight vector. A weight vector can be used to control the importance of each segmentation. For example, later (or earlier) time segmentations can have higher weight.

At 516, in response to determining that a weight vector has not been defined, for the current time segmentation, the value for the count $C_i$ of identified segmentations below the threshold can be maintained as previously aggregated (or can be set to the number of identified segmentations below the threshold). In some implementations, $C_i$ is (potentially) adjusted with each iteration of the second iteration construct, based on the comparison of D to the threshold.

At 518, in response to determining that a weight vector has been defined, indices of identified segmentations (e.g., of segmentations having a distance below the threshold) are retrieved. At 520, corresponding weights in the weight vector are identified. For instance, a decaying weight vector w can be defined as $w=\{1, 2, \ldots, N_{TS}-l_s+1\}$, where each element of w is for one time series segment and where w is configured to give more weight to more recent time segmentations. At 522, a sum of identified weight elements is determined, and a weighted count $C_i$ for the current time segmentation is set to the determined sum.

In some implementations, the determination of $C_i$, either as an unweighted count (corresponding to step 516) or a weighted count (corresponding to step 522), is determined, for the current time series segmentation, within the second iteration construct, using a formula of: $C_i=C_i+1 \times w_j$. If a weight vector has not been defined, $w_j$ can be 1, which can result in a simple incrementing of $C_i$. If a weight vector has been defined, $w_j$ can be greater than one, resulting in weighted counts being accumulated in $C_i$.

At 524, $C_i$ is adjusted for the current time series segmentation, using a formula of:

$$C_i = \log\left(\frac{C_i}{\Sigma w}\right).$$

At 526, the first iteration construct is moved to a next segmentation within the recency period. For instance, an index value of i can be incremented, and steps 510 to 524 can be repeated for the next segmentation.

At 528, after the first iteration construct has ended and all time segmentations within the recency period have been processed, a value $\text{info}^{l_s}$ is determined as a sum of all $C_i$ values calculated for time segmentations in the recency period. In some implementations, $\text{info}^{l_s}$ is accumulated, within the first iteration construct, using a formula of: $\text{info}^{l_s} = \text{info}^{l_s} + C_i$.

At 530, $\text{info}^{l_s}$ is adjusted using a formula of:

$$\text{info}^{(l_s)} = \frac{\text{info}^{l_s}}{N_{Seg}}.$$

At 532, $l_s$ is incremented by one (e.g., $l_s = l_s + 1$), to create a lengthened time series segmentation length, and steps 504 to 530 are repeated to calculate an $\text{info}^{(l_s+1)}$ value, using the longer time series segmentation length. That is, $\text{info}^{(l_s+1)}$ is calculated using the same steps as for calculation of $\text{info}^{l_s}$, but using a larger value for $l_s$.

At 534, the informative factor for the time series is calculated, to reflect a difference between $\text{info}^{l_s}$ and $\text{info}^{(l_s+1)}$, e.g., using a formula of:

TS informative Factor=$|\text{info}^{(l_s+1)} - \text{info}^{(l_s)}|$.

The informative factor for the time series can be used when calculating the informative score for the time series, in combination with the time interval impact factor for the time series. For example, given the above calculations, a TS informative Score can be calculated for a time series using a formula of: TS Informative Score=Time Interval impact Factor×TS informative Factor. When the TS informative score is calculated based on time series of each of multiple date-type columns, the date-type columns can be ranked based on the determined TS informative scores. One or more actions can be performed based on the ranking. For instance, one or more date-type columns with the highest TS informative score(s) can be highlighted for a user as date-type column(s) with highest priorities, which can help users identify date-type column(s) that are more likely having unstable behavior than other date-type column(s).

Figure 6:
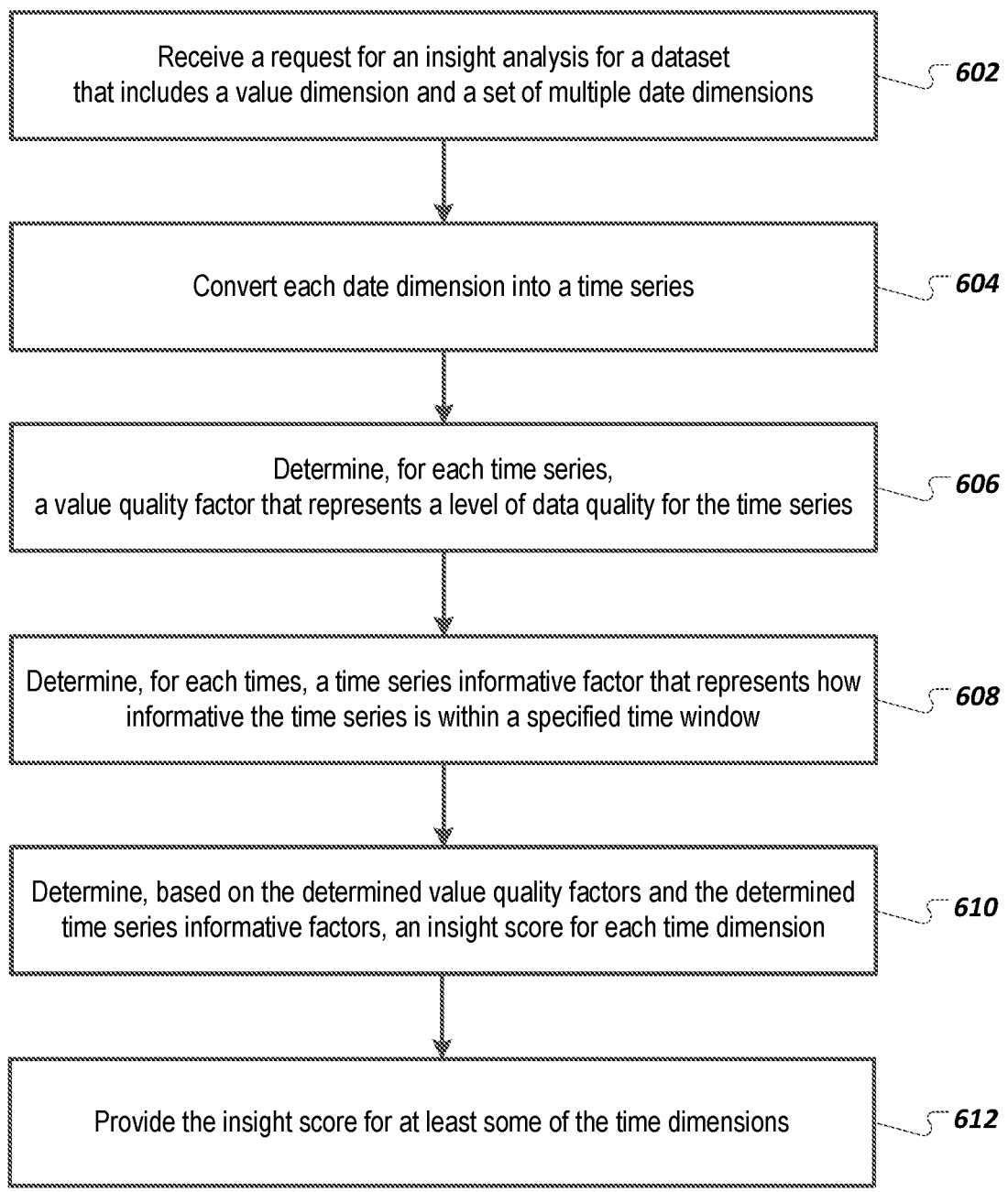
FIG. 6 is a flowchart of an example method for ranking time dimensions.

FIG. 6 is a flowchart of an example method for ranking time dimensions. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the server 102 of FIG. 1.

At 602, a request is received for an insight analysis for a dataset. The dataset includes a value dimension and a set of multiple date dimensions. At least some of the date dimensions have missing values over a time range of dates included in the multiple date dimensions. The request includes a specified time window within the time range.

At 604, each date dimension is converted into a time series.

At 606, for each time series, a value quality factor is determined that represents a level of data quality for the time series. The value quality factor for a time series can represent a number of missing values in the time series and distribution of time points in the time series.

At 608, for each time series, a time series informative factor is determined that represents how informative the time series is within the specified time window. The time series informative factor for a time dimension can be based on changes in the value dimension for dates in the specified time window, such as relative to changes in the time dimension as a whole.

Determining the time series informative factor for a time dimension can include generating time segmentations for time points in the specified time window, determining metrics for the generated time segmentations, and comparing the metrics for the generated time segmentations to corresponding metrics for all time points in the time dimension. Determining the time series informative factor for a time dimension can include using a decaying weight vector to assign different weights to different time segmentations.

At 610, for each time dimension, an insight score is determined based on the determined value quality factors and the determined time series informative factors, wherein the insight score combines the value quality factor and the time series informative factor for the time dimension. A higher insight score for a time dimension represents a higher level of insight provided by the time dimension. Determining the insight score for a given time dimension can include multiplying the value quality factor for the time dimension by the times series informative factor for the time dimension.

At 612, the insight score is provided for at least some of the time dimensions. A highest ranked score or a set of highest ranked scores can be provided, for example, with an indication of the highest ranked time dimension(s).

FIG. 7 is an example ranking table 700 illustrating use of algorithm outputs for other types of ranking. For instance, the described time series ranking algorithm outputs can be used with other ranking criteria, when choosing a best time dimension. For instance, the ranking table 700 can be used to score each of multiple time dimensions, using algorithm outputs and other factors.

The ranking table 700 is organized so that each row corresponds to one time dimension and each column corresponds to one criteria. For example, Date_1 702, Date_2 704, Date_3 706, and Date_4 708 time dimensions correspond to rows one, two, three, and four respectively. Columns two through four correspond to recency 710, distribution 712, format 714, and time series analysis 716 criteria, respectively.

Each time dimension is evaluated and assigned a score for each criterion. For instance, for the recency criterion 710, the Date_1 time dimension 702 has a score of three 718, whereas the Date_3 time dimension 706 has a score of one 720. For instance, the Date_1 time dimension 702 may have more recent data than the Date_3 time dimension 706. As another example, for the distribution criterion 712, the Date_1 time dimension 702 has a score of four (722) and the Date_3 time dimension 706 has a score of one (724). Distribution scores 722 and 724 can be determined based on the time interval impact factor calculations described above. The Date_1 time dimension 702 may have a higher distribution score due to higher data quality, such as more unique values and fewer missing values than the Date_3 time dimension 706, for example.

As another example, the Date_1 time dimension 702 has a score of one (726) for the time series analysis criterion 716 whereas the Date_2 time dimension 704 has a score of two (728). Time series analysis scores can be based on informative factor calculations described above. The Date_2 time dimension 704 may be more informative than the Date_1 time dimension 702, for example.

Respective scores for a time dimension can be added to create a total score for the time dimension, as shown in a score column 730. For instance, the Date_1 time dimension 702 has a total score of ten (732). Time dimensions can be ranked based on total scores, as shown in a ranking column 734. A time dimension with a highest total score can be regarded as a best time dimension and can be highlighted for a user. For instance, the Date_1 time dimension 702 has a first place ranking 736.

Figure 8A:
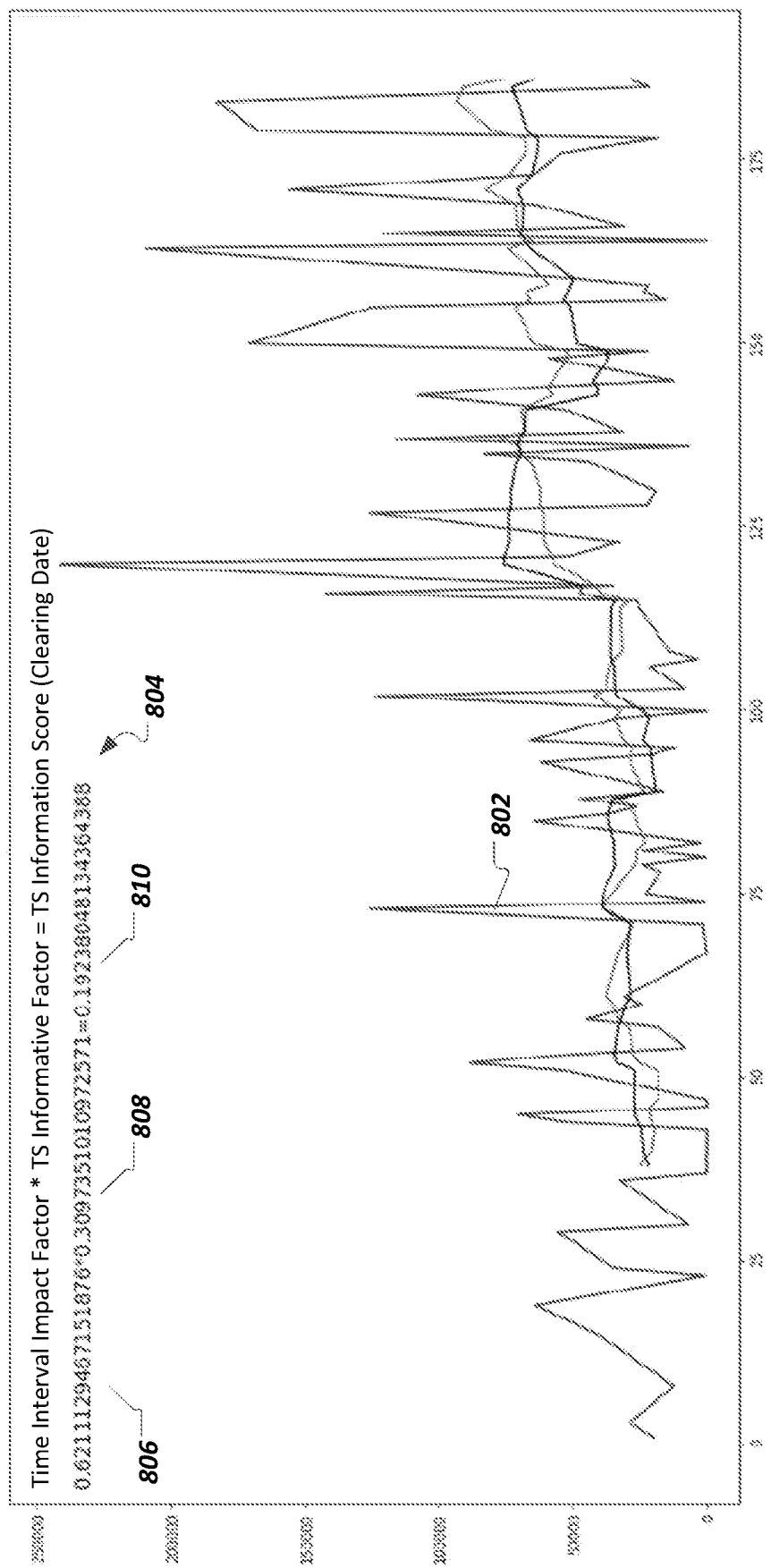
FIGS. 8A-8F illustrate example results for a first example data set.
Figure 8B:
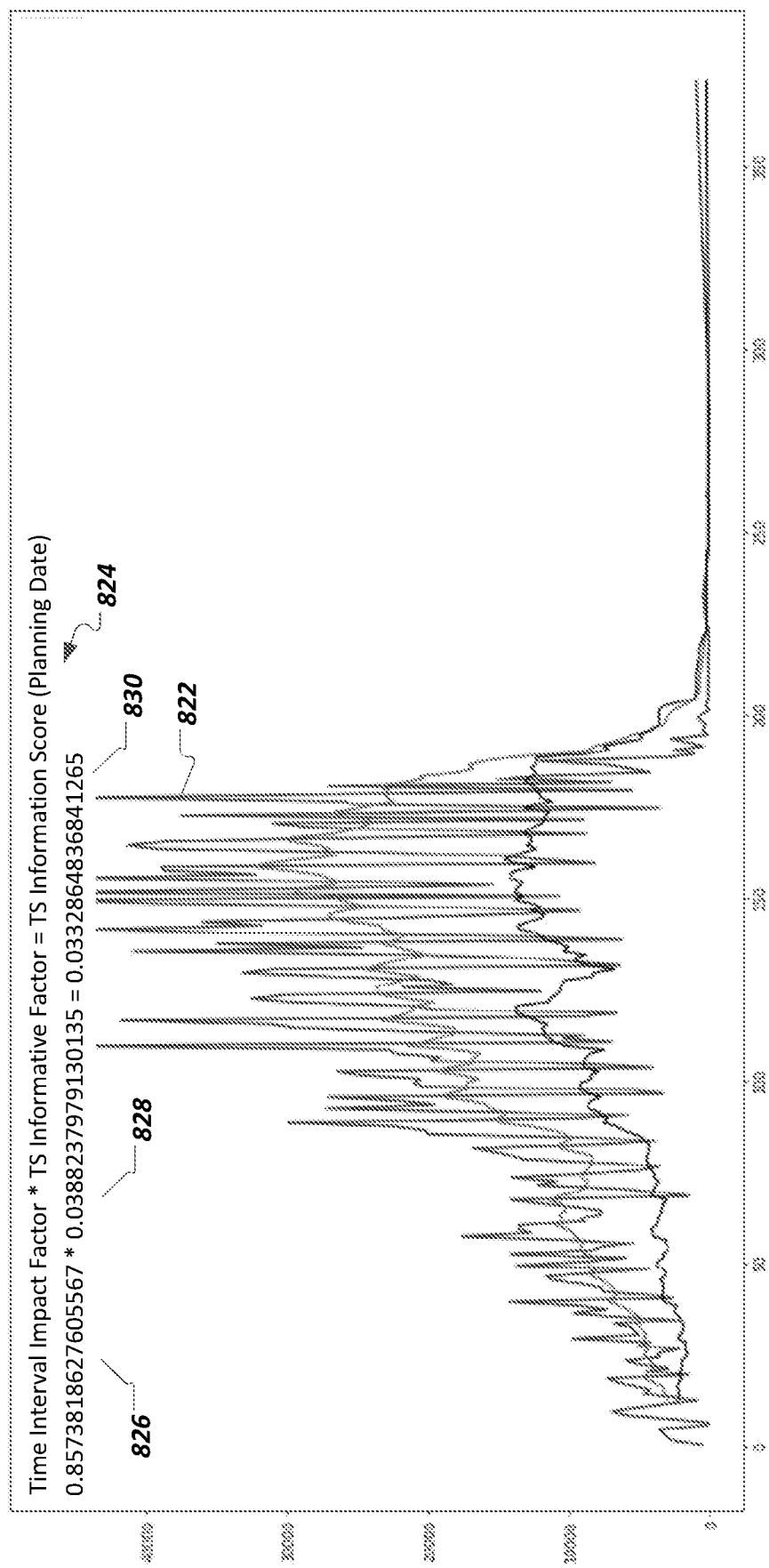
Figure 8C:
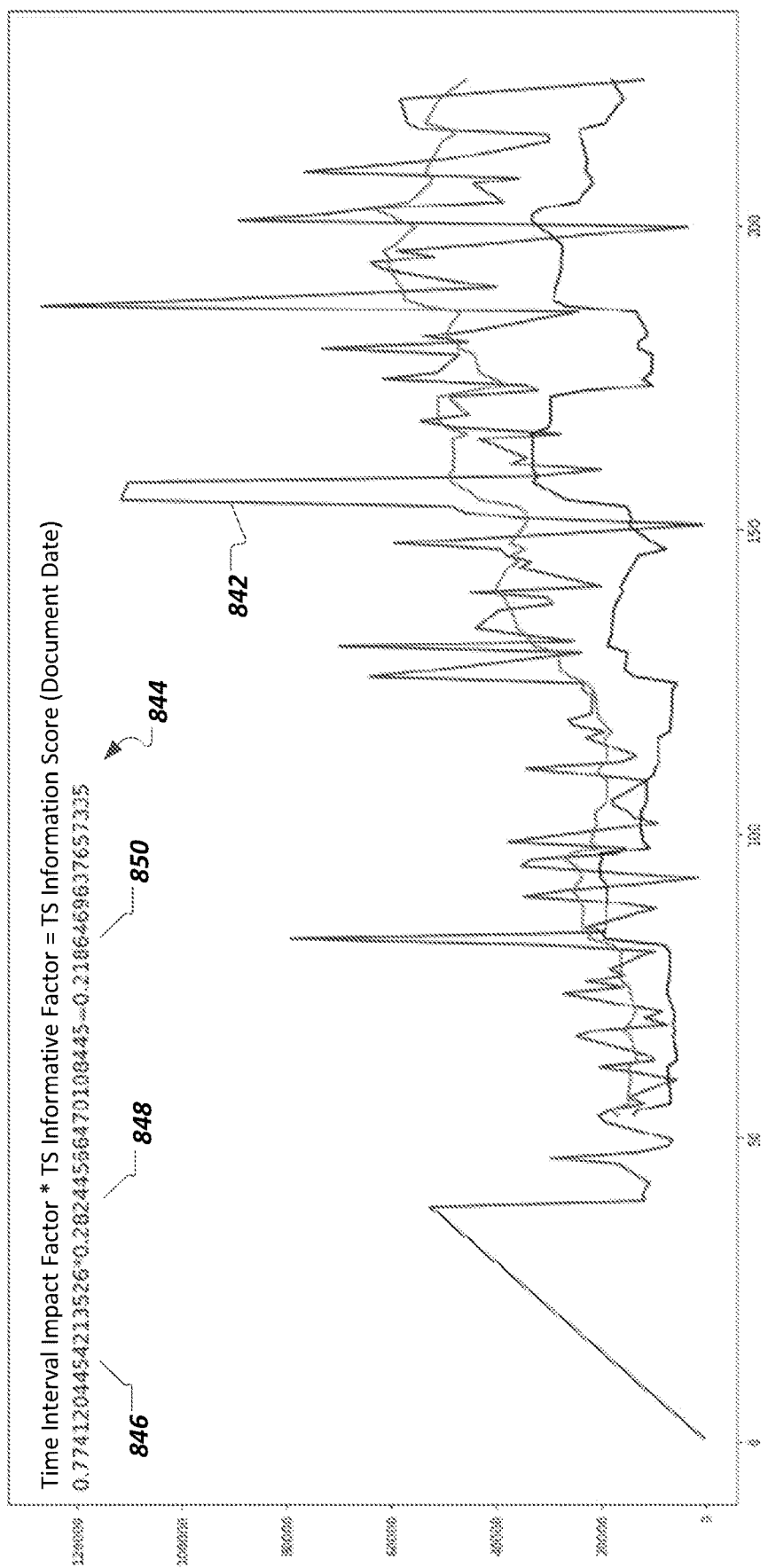

FIGS. 8A-8F illustrate example results for a first example data set. The first example data set includes example invoicing data and includes a value column and three date-type columns. The value column indicates invoicing amounts. Each invoice may be associated with three different types of dates: a clearing date, a planning date, and a document date. FIGS. 8A-8C illustrate graphs 800, 820, and 840 that plot data for the clearing date, planning date, and document date columns, respectively.

Based on the invoice data, one time series is extracted for each date-type column. For example, FIGS. 8A-8C include time series graphs 802, 822, and 842 for the clearing date, planning date, and document date columns, respectively. Furthermore, a moving average and moving standard deviation are also plotted in each graph 802, 822, or 842 so as to visualize the underlying change of respective time series.

The algorithms discussed herein are used to create scores for each date-type column. An observing time window of ninety days has been configured, and any active change in a recent period is weighted more importantly than for past time points. As shown in equations 804, 824, and 844, respective time interval impact factors 806, 826, and 846 of 0.62, 0.86, and 0.77 for the clearing date, planning date, and document date columns have been computed. Accordingly, the time series for the planning date column has been shown to have the best data quality (e.g., which can come from fewer missing values and time points being more equally distributed in the planning date column). In other words, the time series for the planning date column may reflect planning date activity better than the other columns reflection of clearing dates and document dates, since less information is missing.

Using the algorithms described herein, a time series (TS) informative factor is calculated for each of the clearing date, planning date, and document date columns. For example, the clearing date column has a highest informative value 808 of 0.309, the document date column has a second highest informative value 848 of 0.282, and the planning date column has a third highest informative value 828 of 0.039. Finally, TS informative scores are calculated by combining respective time series interval factors and respective TS informative factors. The document date column has a highest TS informative score 850 of 0.218, followed by a score 810 of 0.192 for the clearing date column, and a score 830 of 0.033 for the planning date column.

By comparing the three time series and associated scores of the three date-type columns in the first example data set, insights can be surfaced that indicate that although changes are more active in the planning date time series, there is minimal recent change, especially within the most recent ninety days, leading to a lower informative value for the planning date column. In contrast, the clearing date time series and the document date time series have more consistent changes leading to higher informative values. However, the document date time series has more periodical change, whereas the clearing date time series has more unexpected change over time, thereby leading to a slightly higher informative value for the clearing date column than for the document date column.

For the examples in FIGS. 8A-8C, respective TS Informative factors are calculated based on an assumption that activity in recent periods is more important than activity from older periods. Such an assumption has impacted results, as compared to scores being calculated without the assumption in place.

Figure 8D:
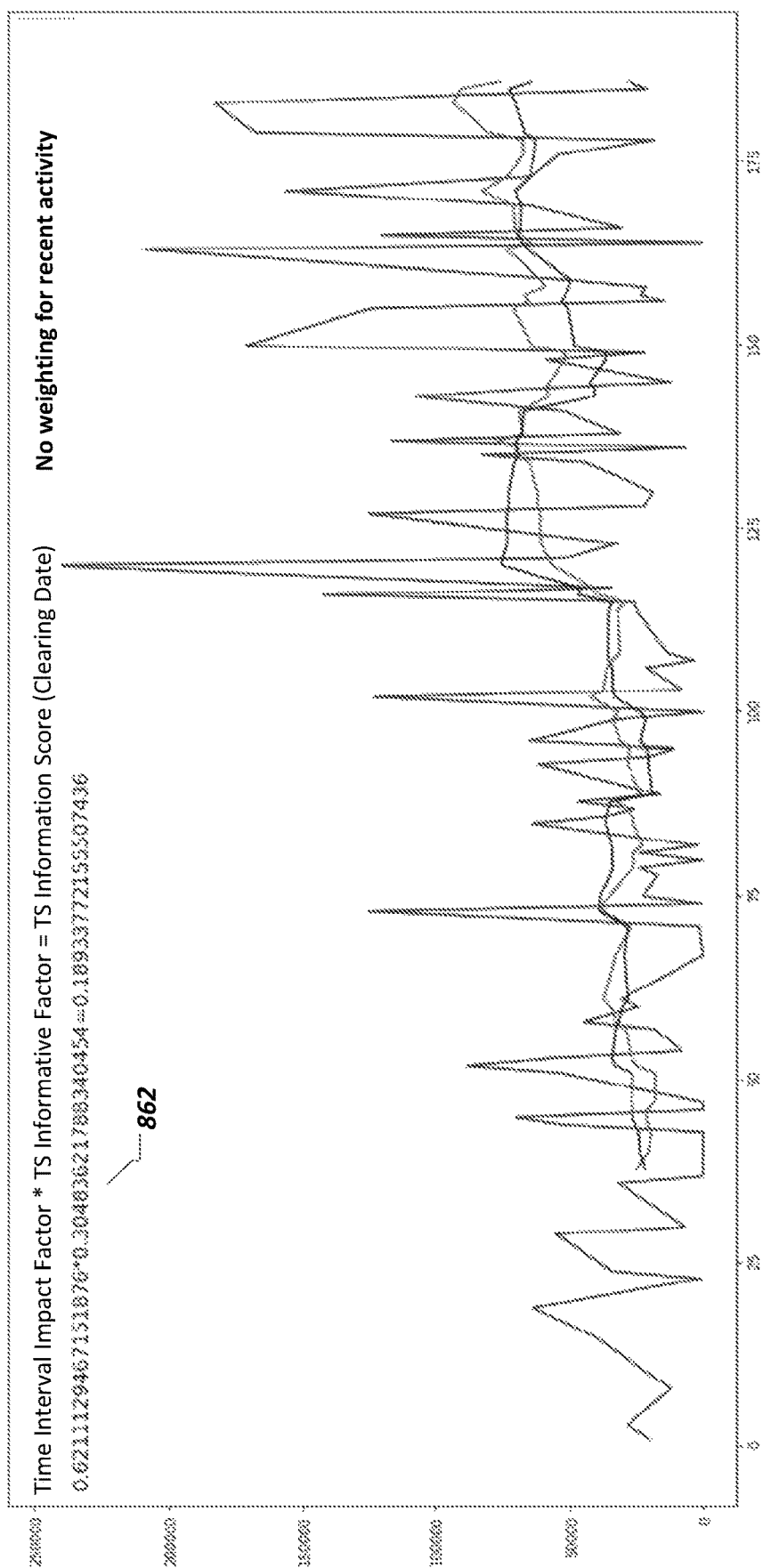
Figure 8E:
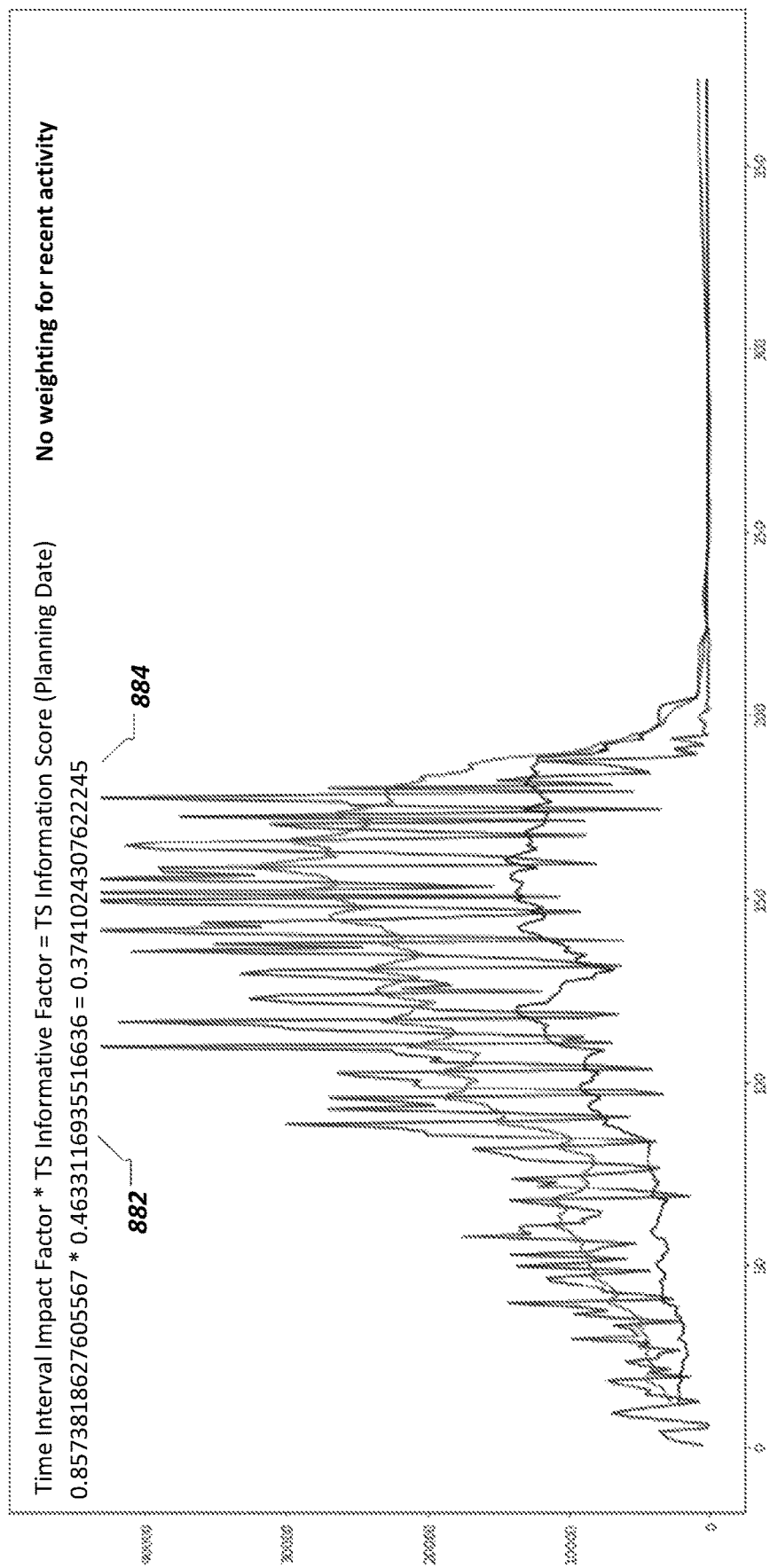
Figure 8F:
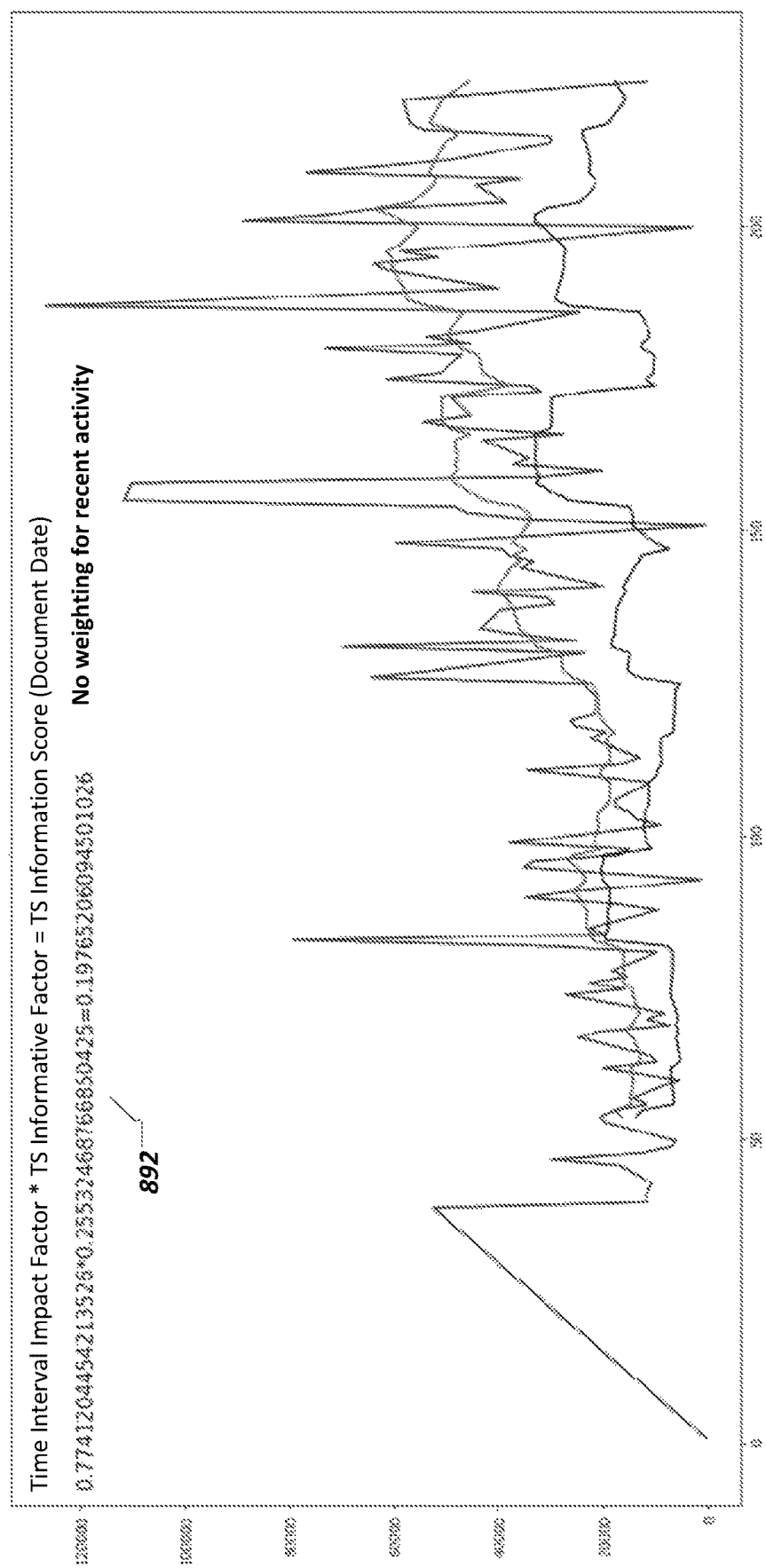

FIGS. 8D-8F illustrate graphs 860, 880, and 890 and associated scores for the clearing date, planning date, and document date columns, respectively, when scores are determined without an assumption of recent activity being more important than older activity. For example, a highest informative value 882 of 0.436 has been calculated for the planning date column (as compared to lower scores 862 and 892, of 0.305 and 0.255, for the clearing date and document date columns, respectively), resulting in a highest TS information score 884 for the planning date column. Accordingly, the planning date has highest informative scores without the regency weighting as compared to lowest informative scores with the recency weighting. Thus, different requirements of time dimension ranking can be fulfilled in a flexible manner, through configuration.

Figure 9A:
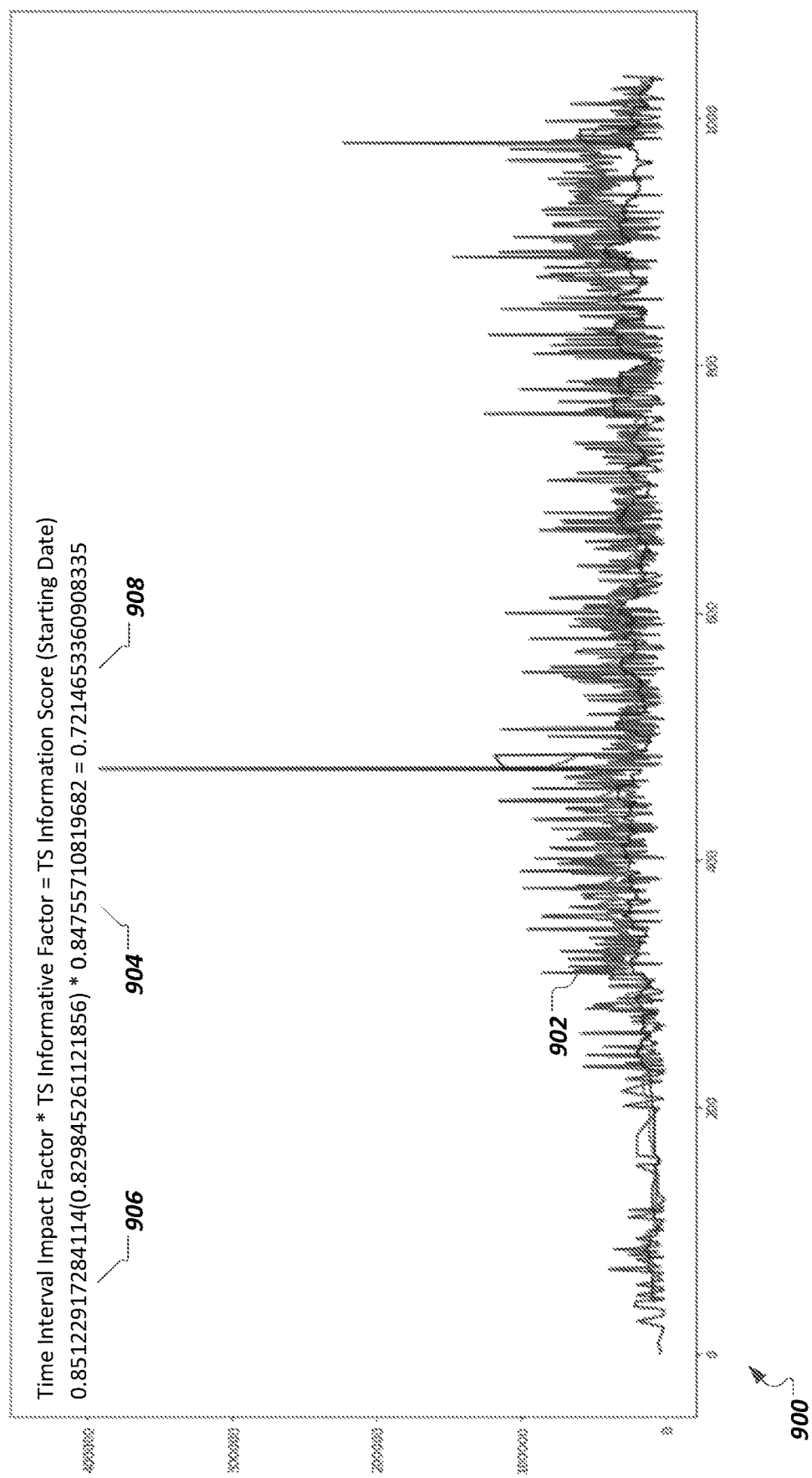
FIGS. 9A-9B illustrate example results for a second example data set.
Figure 9B:
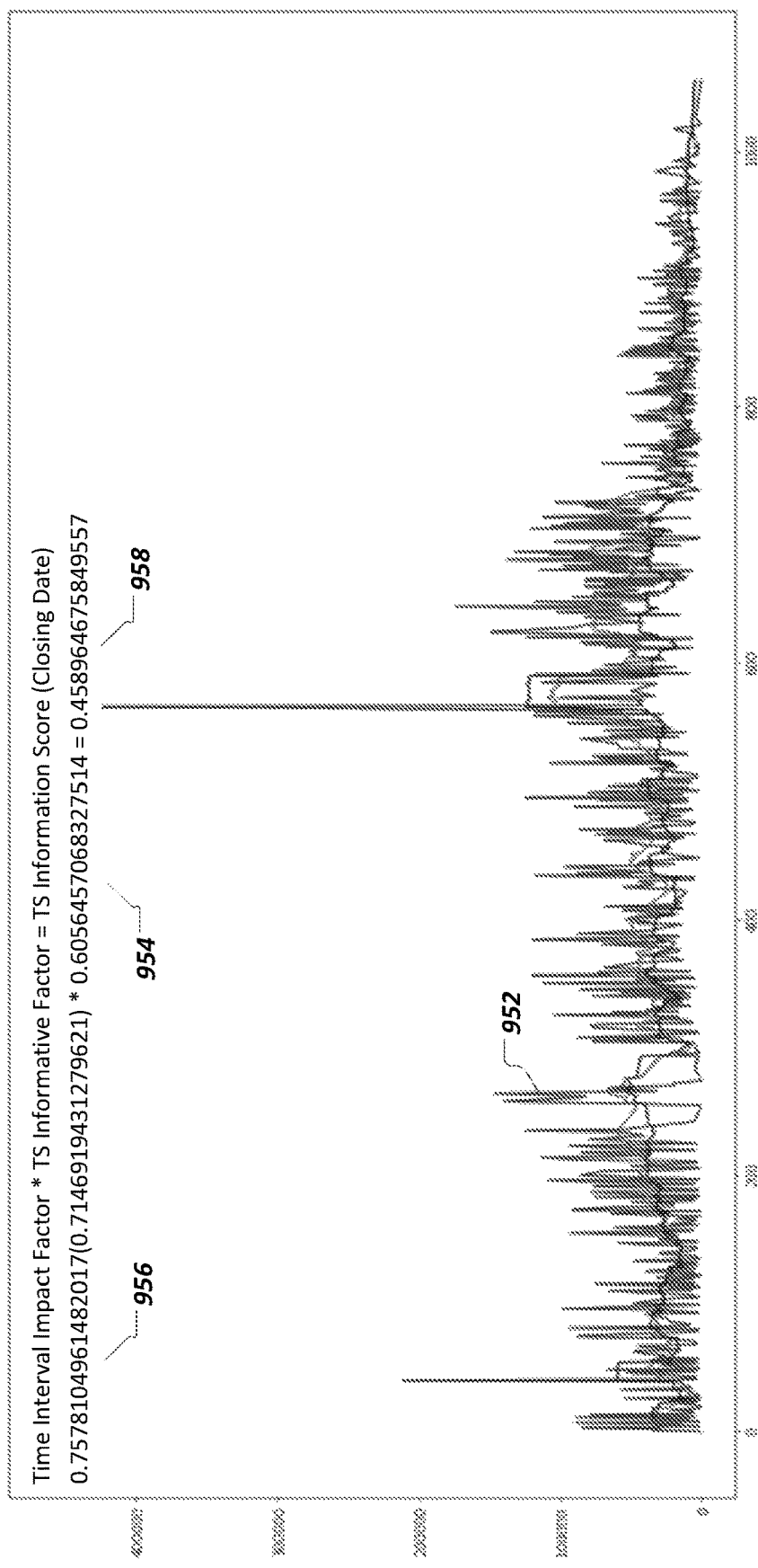
Figure 10A:
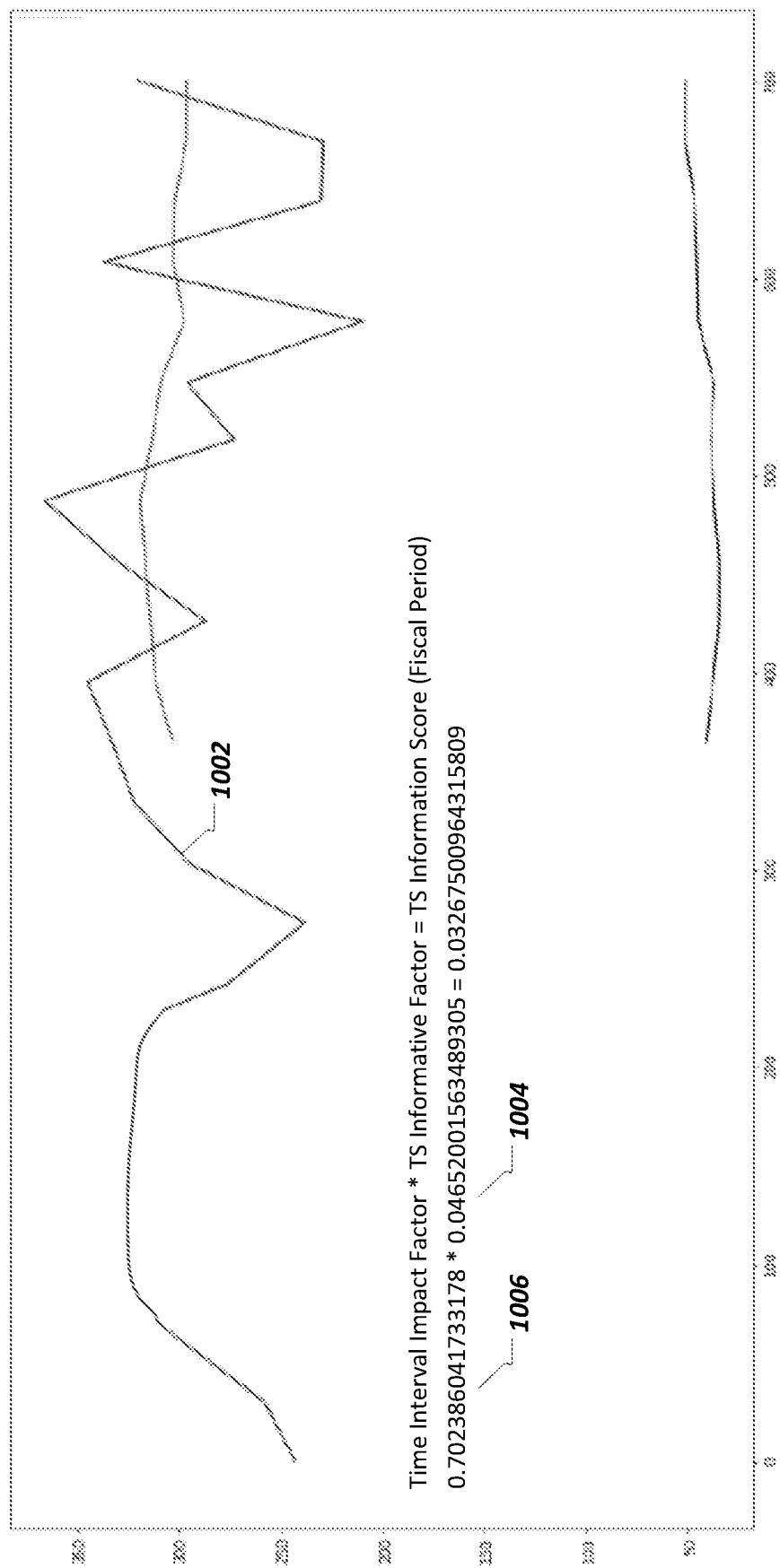
FIGS. 10A-10D illustrate example results for a third example data set.
Figure 10B:
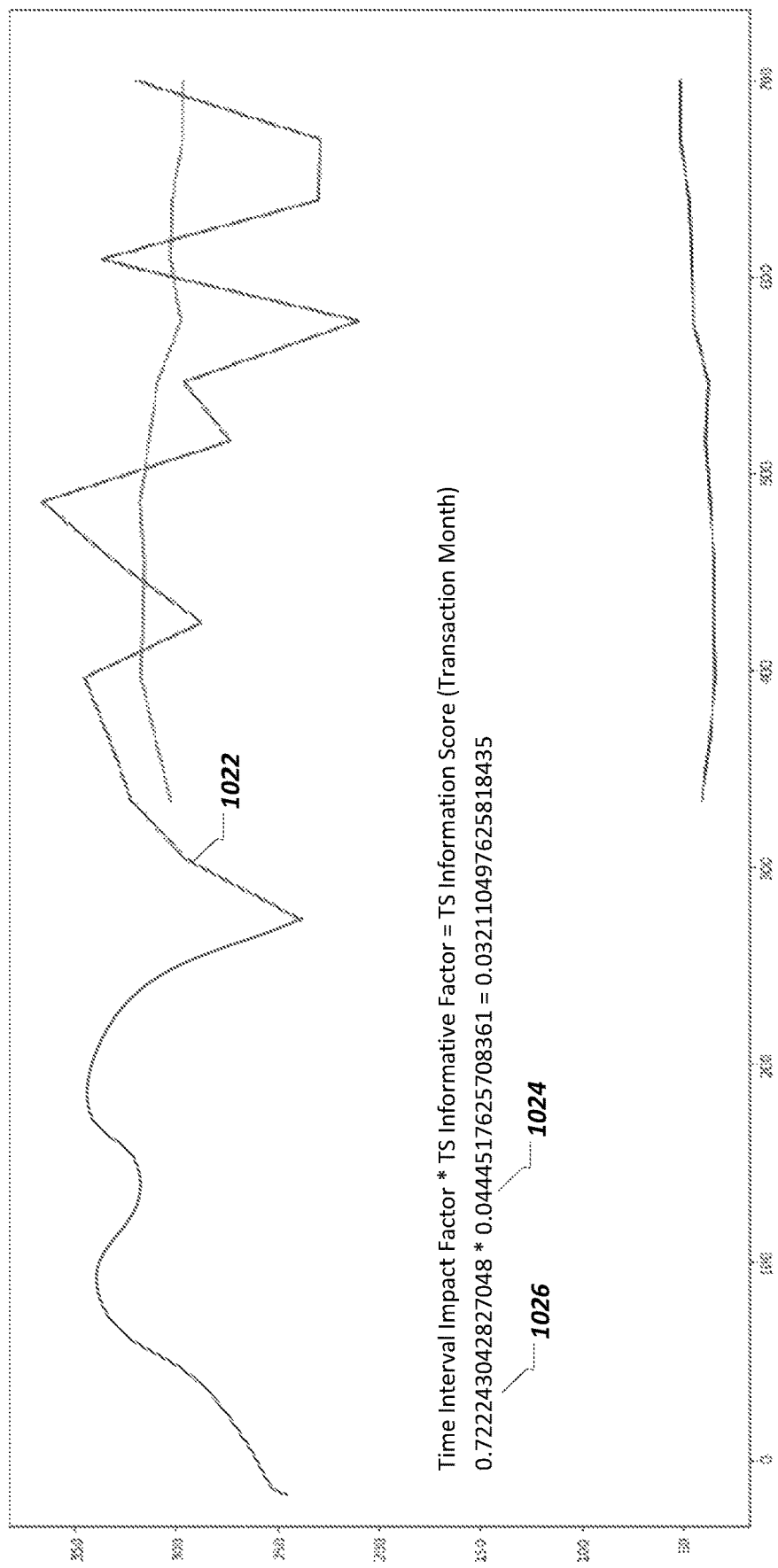
Figure 10C:
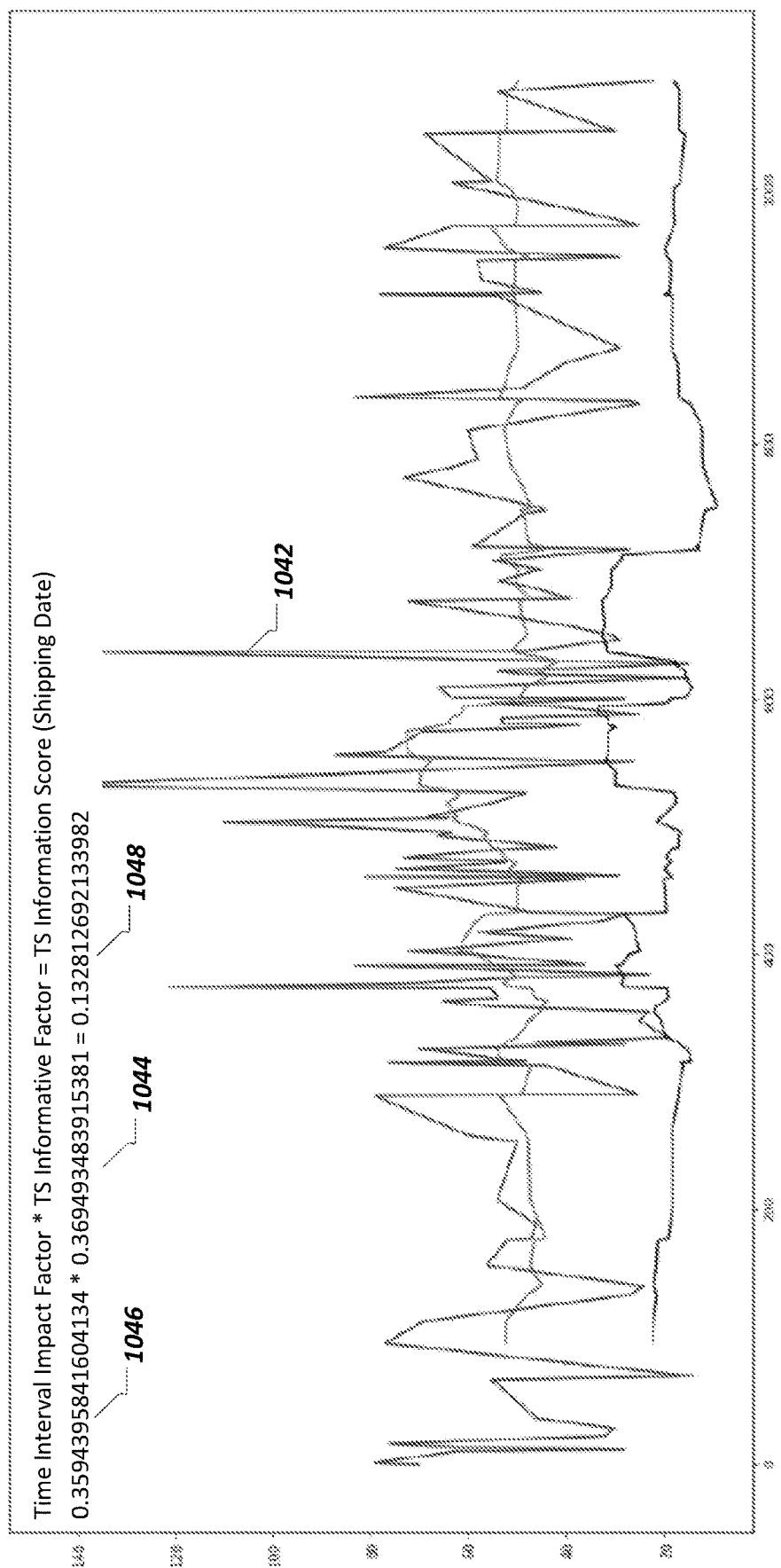
Figure 10D:
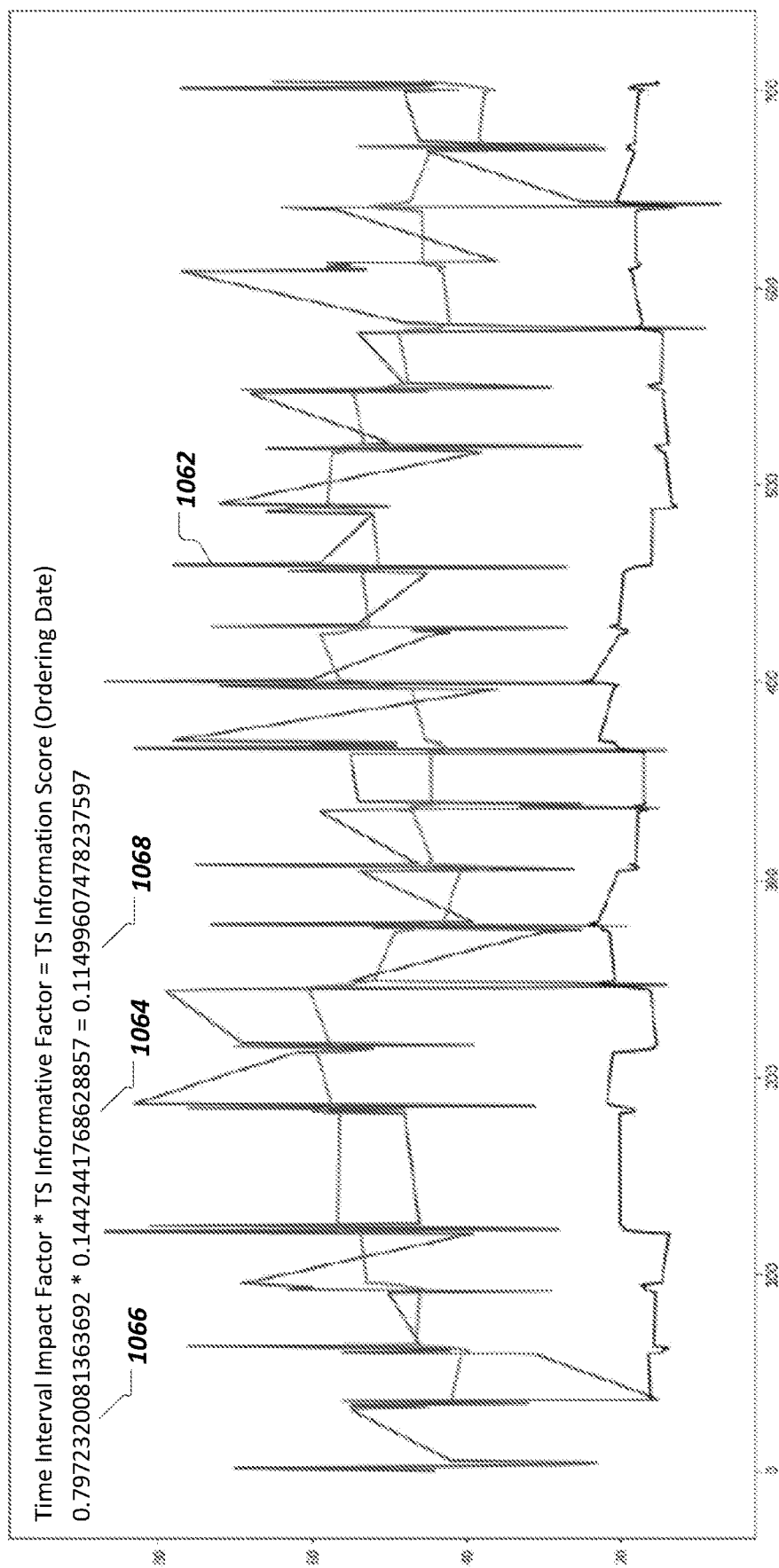

FIGS. 9A-9B illustrate example results for a second example data set. The second example data set includes example transaction data and includes a value column (corresponding to an opportunity item value), a starting date column, and a closing date column. FIGS. 9A-9B illustrate graphs 900 and 950 that plot data for the starting date and closing date columns, respectively. A time series is extracted for each date-type column and FIGS. 9A-9B include time series plots 902 and 952 for the starting date and closing date columns, respectively. Furthermore, a moving average and moving standard deviation are also plotted in each graph 900 or 950 so as to visualize the underlying change of respective time series.

As shown in the graph 900, the time series of the starting date column reflects active changes in recent time points but relatively smooth behavior (e.g., less changes) in early time points. In contrast and as shown in the graph 950, the time series of the closing date column is active in early periods but smooth (less active) in recent periods. Given the two time series with the illustrated behavior, an expectation can be that the starting date column may prove to be of more interest to the user assuming it is more worthwhile to investigate recent activities of opportunity values than earlier activity.

Algorithm results indicate that a calculated informative factor value 904 for the time series of the starting date column is 0.848, whereas an informative factor value 954 for the time series of the closing date column is lower (e.g., 0.606). The starting date being more informative proves to be an expected result. Furthermore, the data quality of the starting date column is better than the closing date column (as reflected by time interval impact factor score values 906 and 956 of 0.85 and 0.75, respectively). Accordingly, the starting date column has a higher overall TS informative score than the closing date column (as reflected by TS informative scores values 908 and 958 of 0.721 and 0.459, respectively).

FIGS. 10A-10D illustrate example results for a third example data set. The third example data set includes example transaction data and a value column (corresponding to net income), a fiscal period column, a transaction month column, a shipping date column, and an ordering date column. A time granularity for fiscal period and transaction month data is month-based (vs. day-based), which is supported by the algorithm.

FIGS. 10A-10D include graphs 1000, 1020, 1040, and 1060 that plot data for the fiscal period column, the transaction month column, the shipping date column, and the ordering date column, respectively. A time series is extracted for each date-type column. For example, FIGS. 10A-10D include time series plots 1002, 1022, 1042, and 1062 for the fiscal period column, the transaction month column, the shipping date column, and the ordering date column, respectively. Furthermore, a moving average and moving standard deviation are also plotted in each graph 1000, 1020, 1040, 1060 so as to visualize the underlying change of respective time series.

The graphs 1000 and 1020 illustrate that net income, observed from fiscal period and transaction month points of view, is relatively stable. In contrast, a change of net income can be more active from ordering and shipping points of view. Furthermore, a comparison of the graphs 1040 and 1060 indicates that the time series of the ordering date column indicates more periodic data, as compared to the shipping date column. Therefore, it can be expected that the shipping date column may be more informative regarding net income data.

Results of performing the algorithm include the shipping date column having a highest informative factor value 1044 of 0.369, which is higher than a second-highest informative factor value 1064 of 0.144 for the ordering date column. Informative factor values 1004 and 1024 of 0.046 and 0.044 for the fiscal period column and the transaction month column, respectively, are comparatively lower.

Considering data quality, time series interval factor values 1066, 1026, and 1006 for the ordering date column, the transaction month column, and the fiscal period column are 0.797, 0.722, and 0.702, respectively. However, a time series interval factor value 1046 for the shipping date column is a lowest time series interval factor, at 0.359. However, the shipping date column still has a highest overall informative score 1048 of 0.132, which is slightly higher than a second-highest informative score 1068 of 0.114 for the ordering date column. The results shown in FIGS. 10A-10D are generally consistent with expectations. Furthermore, weights and factors of the algorithm can be adjusted or configured, to ensure desired results.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request for an insight analysis for a dataset, wherein the dataset includes a value dimension and a set of multiple date dimensions, wherein at least some of the date dimensions have missing values over a time range of dates included in the multiple date dimensions, and wherein the request includes a specified time window within the time range;
generating multiple times series by converting each date dimension of the multiple date dimensions into a respective time series;
determining, for each respective time series of the multiple time series, a value quality factor that represents a level of data quality for the respective time series;
determining, for each respective time series of the multiple time series, a time series informative factor that represents how informative the respective time series is within the specified time window;
determining, based on the determined value quality factors and the determined time series informative factors, an insight score for each time series of the multiple time series, wherein a respective insight score for a respective time series is based on both the value quality factor for the respective time series that represents the level of quality for the respective time series and the time series informative factor for the respective time series, and wherein the respective insight score for the respective time series that represents both how informative the respective time series is within the specified time window and a respective likelihood that the respective time series exhibits unstable behavior as compared to other time series of the multiple time series;
determining, from among the insight scores of the multiple time series, a set of highest-ranked insight scores for a set of highest ranked time series; and
providing at least some of the highest-ranked time series and the insight scores for the highest-ranked time series to a machine learning system.

2. The method of claim 1, wherein a higher insight score for a time series represents a higher level of insight provided by the time series.

3. The method of claim 1, wherein determining the insight score for a given time series comprises multiplying the value quality factor for the time series by the times series informative factor for the time series.

4. The method of claim 1, wherein the value quality factor for a time series represents a number of missing values in the time series and distribution of time points in the time series.

5. The method of claim 1, wherein the time series informative factor for a time series is based on changes in the value dimension for dates in the specified time window.

6. The method of claim 5, wherein the time series informative factor for a time series is based on changes in the specified time window relative to changes in the time series.

7. The method of claim 1, wherein determining the time series informative factor for a time series comprises:
generating time segmentations for time points in the specified time window;
determining metrics for the generated time segmentations; and
comparing the metrics for the generated time segmentations to corresponding metrics for all time points in the time series.

8. The method of claim 7, wherein determining the time series informative factor for a time series comprises using a decaying weight vector to assign different weights to different time segmentations.

9. A system comprising:
one or more computers; and
a computer-readable medium coupled to the one or more computers having instructions stored thereon which, when executed by the one or more computers, cause the one or more computers to perform operations comprising:
receiving a request for an insight analysis for a dataset, wherein the dataset includes a value dimension and a set of multiple date dimensions, wherein at least some of the date dimensions have missing values over a time range of dates included in the multiple date dimensions, and wherein the request includes a specified time window within the time range;
generating multiple times series by converting each date dimension of the multiple date dimensions into a respective time series;
determining, for each respective time series of the multiple time series, a value quality factor that represents a level of data quality for the respective time series;
determining, for each respective time series of the multiple time series, a time series informative factor that represents how informative the respective time series is within the specified time window;
determining, based on the determined value quality factors and the determined time series informative factors, an insight score for each time series of the multiple time series, wherein a respective insight score for a respective time series is based on both the value quality factor for the respective time series that represents the level of quality for the respective time series and the time series informative factor for the respective time series, and wherein the respective insight score for the respective time series represents both how informative the respective time series is within the specified time window and a respective likelihood that the respective time series exhibits unstable behavior as compared to other time series of the multiple time series;
determining, from among the insight scores of the multiple time series, a set of highest-ranked insight scores for a set of highest ranked time series; and
providing at least some of the highest-ranked time series and the insight scores for the highest-ranked time series to a machine learning system.

10. The system of claim 9, wherein a higher insight score for a time series represents a higher level of insight provided by the time series.

11. The system of claim 9, wherein determining the insight score for a given time series comprises multiplying the value quality factor for the time series by the times series informative factor for the time series.

12. A computer program product encoded on a non-transitory storage medium, the product comprising non-transitory, computer readable instructions for causing one or more processors to perform operations comprising:
receiving a request for an insight analysis for a dataset, wherein the dataset includes a value dimension and a set of multiple date dimensions, wherein at least some of the date dimensions have missing values over a time range of dates included in the multiple date dimensions, and wherein the request includes a specified time window within the time range;
generating multiple times series by converting each date dimension of the multiple date dimensions into a respective time series;
determining, for each respective time series of the multiple time series, a value quality factor that represents a level of data quality for the respective time series;
determining, for each respective time series of the multiple time series, a time series informative factor that represents how informative the respective time series is within the specified time window;
determining, based on the determined value quality factors and the determined time series informative factors, an insight score for each time series of the multiple time series, wherein a respective insight score for a respective time series is based on both the value quality factor for the respective time series that represents the level of quality for the respective time series and the time series informative factor for the respective time series, and wherein the respective insight score for the respective time series represents both how informative the respective time series is within the specified time window and a respective likelihood that the respective time series exhibits unstable behavior as compared to other time series of the multiple time series;
determining, from among the insight scores of the multiple time series, a set of highest-ranked insight scores for a set of highest ranked time series; and
providing at least some of the highest-ranked time series and the insight scores for the highest-ranked time series to a machine learning system.

13. The computer program product of claim 12, wherein a higher insight score for a time series represents a higher level of insight provided by the time series.

14. The computer program product of claim 12, wherein determining the insight score for a given time series comprises multiplying the value quality factor for the time series by the times series informative factor for the time series.

* * * * *